(12) United States Patent
Dowe et al.

(10) Patent No.: US 6,295,416 B1
(45) Date of Patent: Sep. 25, 2001

(54) ONE TIME USE CAMERA USES MAGNETIC MICRO-SHUTTER AS AN EXPOSURE FRAME COUNTER

(75) Inventors: David R. Dowe, Holley; Svetlana Reznik, Rochester; Loretta E. Allen, Hilton, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/451,071

(22) Filed: Nov. 30, 1999

(51) Int. Cl.[7] .................................................. G03B 1/66
(52) U.S. Cl. ................................................... 396/285
(58) Field of Search ............................. 396/6, 281, 284, 396/296, 285

(56) References Cited

U.S. PATENT DOCUMENTS

| | | | |
|---|---|---|---|
| 4,012,828 | 3/1977 | Dahl | 29/517 |
| 4,687,311 | 8/1987 | Malloy Desonmeau | 354/217 |
| 4,770,538 | 9/1988 | Orkosalo | 356/429 |
| 5,210,569 | 5/1993 | Harada | 354/442 |
| 5,659,280 | 8/1997 | Lee et al. | 335/284 |
| 5,691,682 | 11/1997 | Jeffers et al. | 335/302 |
| 5,727,240 | 3/1998 | Mizumoto et al. | 396/210 |
| 5,737,650 | * 4/1998 | Debesis et al. | 396/285 |
| 5,737,653 | 4/1998 | Tokui | 396/319 |
| 5,742,856 | 4/1998 | Izukawa | 396/319 |
| 5,749,007 | 5/1998 | Sakurai | 396/319 |
| 5,784,189 | 7/1998 | Bozler et al. | 359/254 |
| 5,809,351 | 9/1998 | Albrecht | 396/284 |
| 5,852,393 | 12/1998 | Reznik et al. | 335/284 |

* cited by examiner

Primary Examiner—David M. Gray
(74) Attorney, Agent, or Firm—James D. Leimbach; Peyton C. Watkins

(57) ABSTRACT

A novel exposure frame counter is disclosed that gives the appearance of more expensive LCD type displays while not requiring the support electronics and has the ability to erase itself after being used. A disc of low permeable magnetic material has exposure frame numbers recorded into the material in a selected manner so as to create a desired magnetic field. A magnetic micro-shutter is used to create the exposure frame numbers by placing individual micro-shutters over the disc which react to the magnetic field of the disc to form numerals that indicate the exposure frame the camera is on. When the camera is advanced, the section of the disc that was indicating the exposure frame advances to the next frame and the previous frame passes across a field created by a strong permanent magnet and is erased by the permanent magnet. The magnetic micro-shutters of the exposure frame counter are formed essentially as a seven-segment display to form the numerals of the exposure frame counter.

20 Claims, 5 Drawing Sheets though it is not required if the frame counter is to be reused in subsequent cameras. Erasure magnets used in other applications are available from Walker Scientific Inc. of Worcester, Mass., 01606-0689, or from Eriez Magnetics of Erie, Pa., 16514-0608.

ONE TIME USE CAMERA USES MAGNETIC MICRO-SHUTTER AS AN EXPOSURE FRAME COUNTER

CROSS-REFERENCE TO RELATED APPLICATIONS

The present application is related to U.S. application Ser. No. 09/451,171 filed concurrently herewith, entitled "Magnetic Micro-Shutters" by David R. Dowe, et al.; and U.S. application Ser. No. 09/449,646 filed concurrently herewith, entitled "Electrically Actuated Magnetic Micro-Shutters" by David R. Dowe, et al.

FIELD OF THE INVENTION

This invention relates to camera exposure frame counters and the use of magnetic micro shutters for use therewith.

BACKGROUND OF THE INVENTION

Many types of exposure frame counters are used in photographic cameras. These counters range from simple mechanical rotating disks where frame numbers appear in a window or pass by a pointer, to digital electronic counters where frame numbers are advanced through expensive electronic components.

As shown in U.S. Pat. No. 4,687,311, a simple rotating disk is used to count the exposures used in a One Time Use Camera. In this system, every time the film in the camera is wound to the next frame, the frame counter increments one count by rotating a counter wheel. The advantages to this system are the simplicity of the counter and the independence for the need of a power source, i.e. a battery. One drawback of this system is that the frame numbers on the wheel tend to be small because the wheel needs to be small and that only every third number is printed on the wheel to save space. Intermediate numbers are omitted and substituted with dots to indicate the frame count.

As shown in U.S. Pat. No. 5,809,351, two rotating disks are used for counting the exposure frames. In this version one wheel counts the single digits for each frame and the second wheel counts the 10's of digits. This system creates a smaller counter with larger numbers.

As shown in U.S. Pat. No. 4,012,828, a Digital Frame Counter is described where the exposures used for a camera are displayed in a digital format. Such a digital frame counter could be a Liquid Crystal Display (LCD). The advantages of this type of display are that individual numbers can be larger than the above discussed rotating wheel, and each frame number can be displayed without resorting to the used of dots as intermediate frame numbers. The disadvantages of this type of display are that LCD's are relatively expensive, require support electronics and can appear dark in low light situations due to their dependence on polarizing filters for them to function.

The closest prior art is U.S. Pat. No. 5,784,189, a Micro-shutter patent assigned to MIT, that employs electrostatic fields to form micro-shutters. However, there is no suggestion for making micro-shutters operative within magnetic embodiment which is less expensive that the electrostatic environment.

From the above discussion, it should be apparent that there remains a need in the art for a display that does not require expensive electronics to operate, counts every exposure frame number and has large exposure frame numbers.

SUMMARY OF THE INVENTION

It is therefore an object of this invention to provide a camera exposure frame counter that provides large easily readable numerals for every exposure frame, and does not require support electronics. It is also an object of this invention to provide a camera exposure frame counter that after an exposure frame has been counted that the ability to count this frame again is eradicated.

The present invention provides a method and apparatus for an exposure frame counter for a camera by providing a substrate having a series of micro-shutter segments on a first surface of the substrate, segments that curl and uncurl in response to magnetic fields, and an alterable indicia that can create magnetic fields that correspond to the micro-shutter segments such that the micro-shutter segment create a discernable display, and altering the indicia to form at least one numeral on the discernable display. An exposure frame counter is provided having a magnetic wheel having a first surface with a series of frame count areas that are formed on the wheel. The alterable indicia is self contained for each of the frame count areas. There is a display formed near the first surface such that the display mates with the alterable indicia contained within the frame count areas, a plurality of micro-shutters having segments that curl and uncurl in response to the alterable indicia contained on the frame count areas.

DETAILED DESCRIPTION OF THE INVENTION

Figure 1:
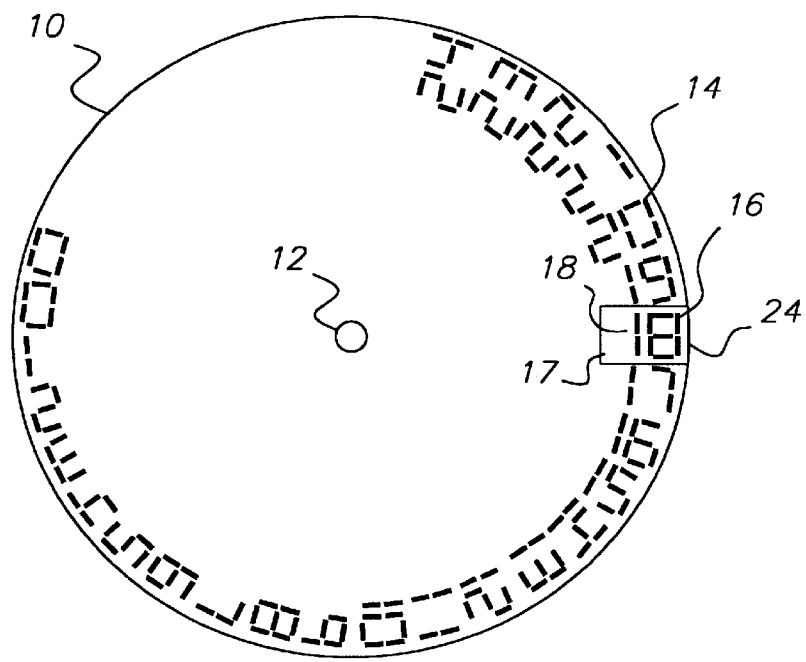
FIG. 1 shows a first embodiment where a magnetic disk rotates beneath a magnetic micro shutter, which has digits that indicate the frame count.

The first embodiment of the present invention is illustrated in FIG. 1, wherein a disk 10 of low permeable magnetic material is placed onto and made to rotate with a center pivot point 12. Digits 14 representing exposure frame numbers 16 are magnetically recorded onto this disk in an ascending fashion so that as the disk is rotated in one direction the digits passing a fixed point 17 count in increasing sequential order. The fixed point 17 is an arbitrary point where the magnetic micro shutter reader is placed so that when the magnetic disk underneath the reader is rotated, the reader can read the magnetized digits underneath. Should the disk 10 be rotated in a reverse direction, the digits 14 passing this fixed point 17 will count in a decreasing sequential order. The digits 14 are magnetically recorded, therefore, they are not visible to the naked eye. Reader 18 allows for the magnetically recorded digits 14 to be viewed by the user.

Figure 6:
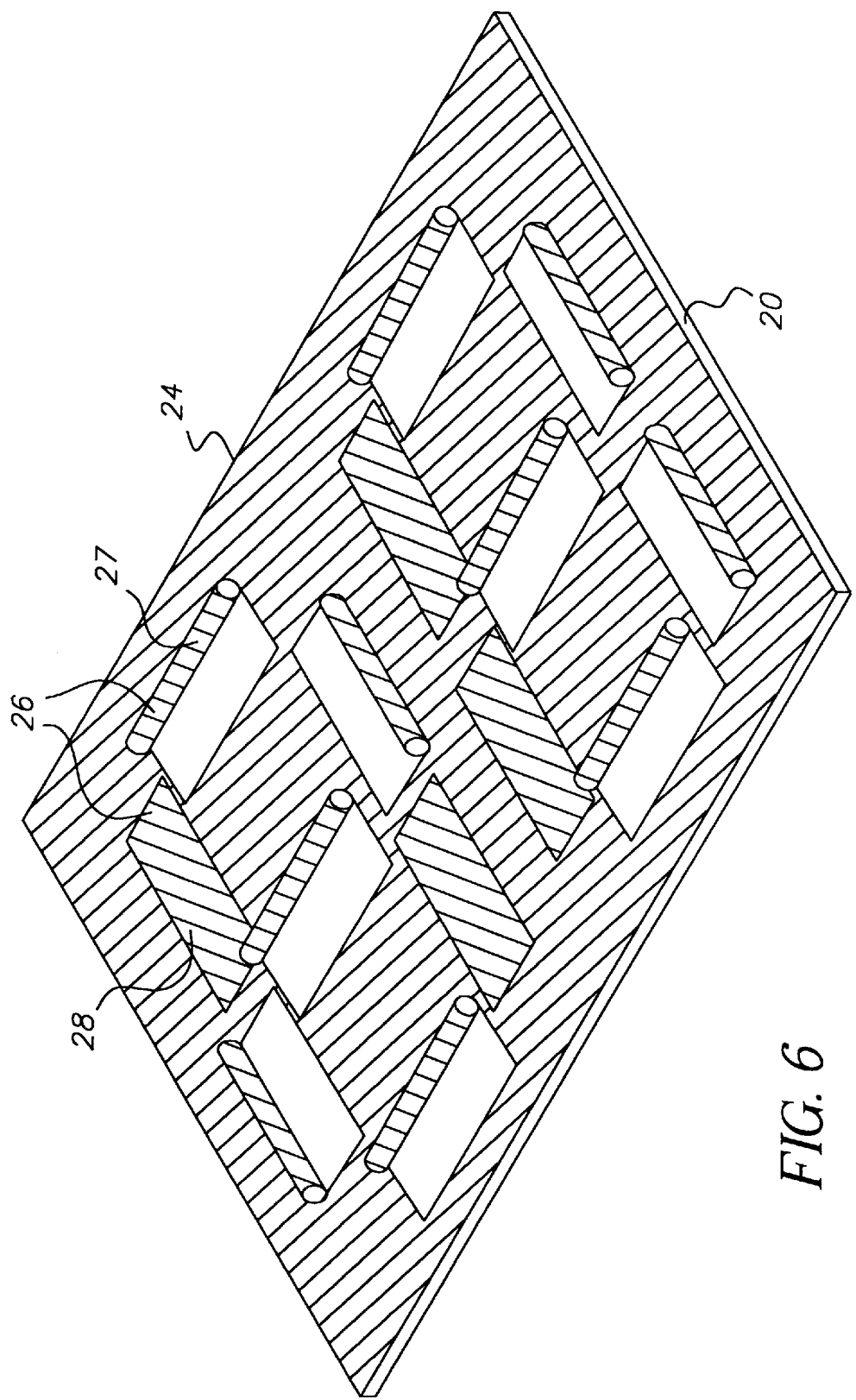
FIG. 6 is a close-up perspective view of the magnetic micro shutter display.

The reader 18 allows the user to view the frame numbers 16 by using magnetic micro-shutters as disclosed in co-pending patent application Ser. No. 09/449,646 and Ser. No. 09/451,171 filed concurrently herewith. The reader 18 is placed over and in close proximity to this magnetic disk. Magnetic micro-shutters are arranged to show the digits 14 of the frame number 16 within the reader 18 by way of seven segment display, in a shape and form very much like a seven segment LCD display. FIG. 6 illustrates the segments 26 of the magnetic micro-shutter display 24 in both rolled up 27 and an unrolled 28 states.

As the magnetic disk 10 is rotated, the magnetized digits 14 thereon pass underneath the magnetic micro-shutter display 24 contained within the reader 18, causing individual segments 26 of the micro shutter to uncurl. For the purposes of illustration of this embodiment, the digits 14 magnetized onto the magnetic disk 10 will cause the individual magnetic micro shutter segments 26 to uncurl where a segment will not be seen. This will cause the effect that the segments 26 to be read by the photographer will appear dark. However, it is also envisioned that the segment 26 within the system could be configured to appear bright rather than dark.

For each exposure used, the film is wound into the take-up chamber of the camera, and the magnetic disk is advanced one increment so that the next ascending or descending digit on the magnetic disk is placed directly under the magnetic micro shutter. The mechanisms employed for advancing the disk 10 one increment at a time are conventional mechanisms commonly found on frame counters used within cameras.

Figure 2:
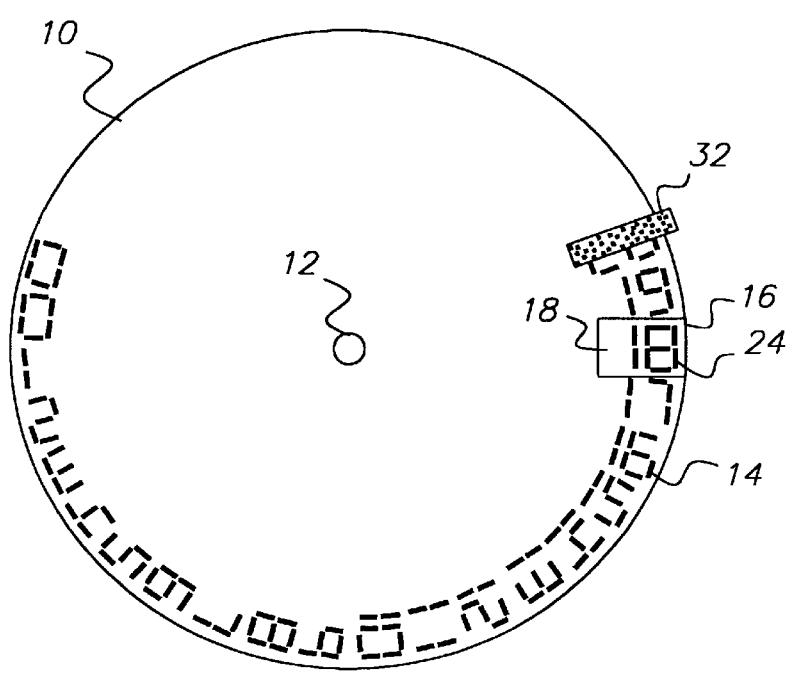
FIG. 2 shows a second embodiment where the same counter system shown in FIG. 1 has an additional magnet positioned near the disk so as to erase the frame count indicating numbers as they pass underneath the magnet.

Referring to FIG. 2, a second embodiment of the present invention is illustrated having a high permeable permanent magnet 32 placed a short distance away from the magnetic micro-shutter display 24, in the direction of rotation of the magnetic disk 10. This magnet 32 is used to re-magnetize the magnetic disk 10 in a manner that erases the magnetically recorded digits 14 previously used for the frame numbers 16 as the digits 14 pass underneath the magnet 32. The purpose of erasing the digits 14 used in the frame information on the magnetic disk 10 is to provide the opportunity for reprogramming at a later date. The erased disk 10 can be reprogrammed for the same or a different number of exposures. This is a highly desirable feature within the art of for One Time Use cameras that are currently very popular, large manufactures of these cameras desire inexpensive reusable parts. Should it be desired to use the frame counter in a re-loadable camera, the permanent magnet 32 can be removed from the assembly.

Figure 3:
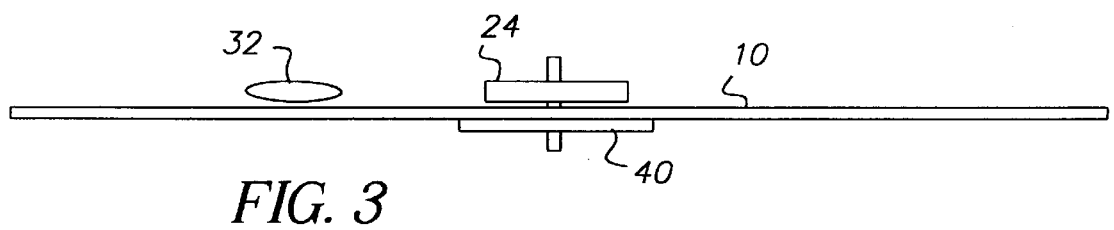
FIG. 3 is a side view of the invention.

FIG. 3 is a side view of the invention showing the relative placement of disk 10, indexing gear 40 (the indexing gear is used to advance the frame counter one increment for every frame of film wound through the camera), magnetic micro shutter display 24 and the erasing magnet 32.

Figure 4:
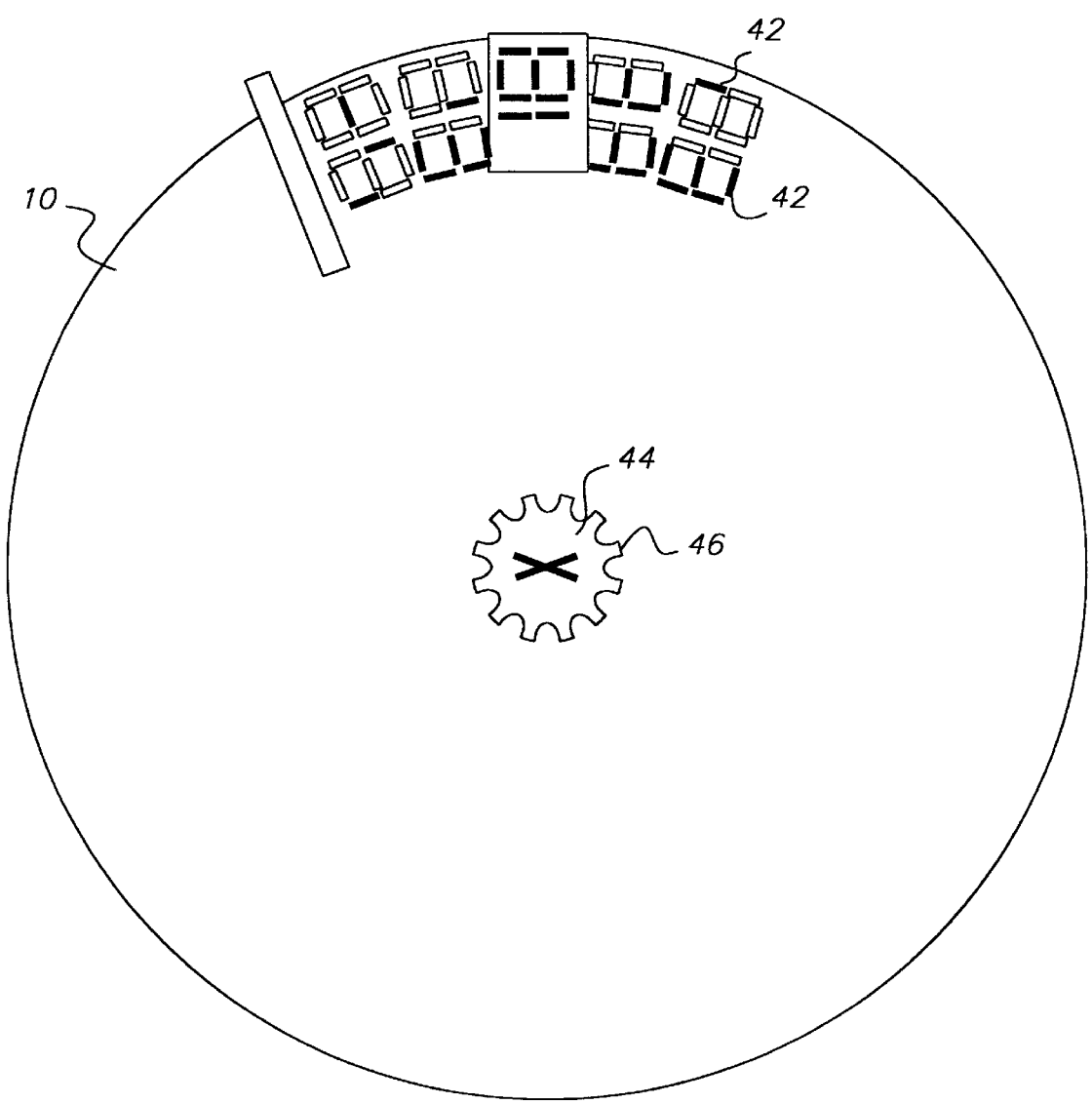
FIG. 4 is a close-up view of the invention.

FIG. 4 shows a close-up of the magnetic disk 10. Each of the segments 26 within the digits 14 that need to be visible within the frame number 16, is magnetized onto the disk 10 and consists of a series of north and south poles which is represented in FIG. 4 by magnetized areas 42. Center pivot point 44, is made to rotate by gear teeth 46. The gear teeth 46 are directly coupled to the magnetic disk 10. The mechanism for advancing the magnetic disk 10 by use of the gear teeth 46 at the rate of one increment per frame, is well known in the art and not shown.

Figure 5:
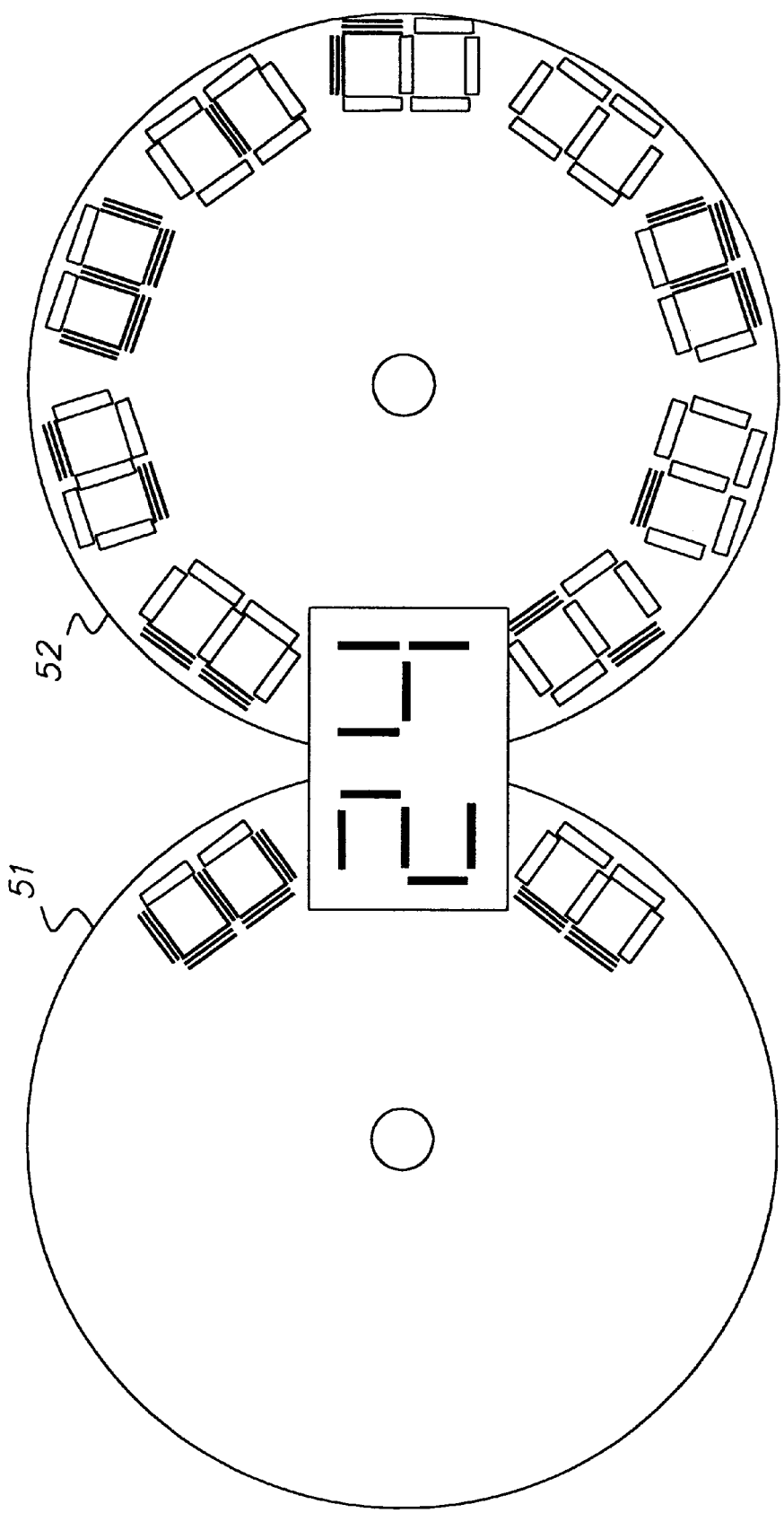
FIG. 5 shows how a two-wheel frame counting mechanism would look by using a magnetic micro shutter display.

FIG. 5 illustrates an alternate embodiment for counting exposure frames which uses two rotating disks 51, 52. The first disk 52 has the digits 0 through 9 magnetized onto it to represent the 1's digit for the frame number, while the second disk 51, would have the digits 1, 2 and possibly 3 or more magnetized onto it. The benefit of this method is that the overall size of the counter can be reduced. U.S. Pat. No. 5,809,351 provides an example of a mechanical version of this frame counter. For every 10 counts, or 360 degrees, disk 52 rotates, disk 51 increments, or decrements, one count position. Note that there is no zero for disk 51 and as such the photographer will not see a zero precede a digit when the frame count is lower than 10.

FIG. 6 is a close-up perspective view of the magnetic micro-shutter display 24. The magnetic micro-shutter segments 26 are the areas on the magnetic micro-shutter display 24 that react to the magnetized areas on disk 10 the runs beneath the magnetic micro-shutter display 24. The effect that these magnetized areas on disk 10 have on the individual magnetic micro-shutter segments 26, is to cause the magnetic micro-shutter segments 26 to uncurl or unroll. The areas that uncurl will appear the same color as the non-segment areas of the display and in this example these areas will appear a silver color. For the segments that do not uncurl, the photographer is able to see through the display and onto the magnetic disk which is a dark color. In FIG. 6 the illustration is showing an exposure frame count of 23.

Figure 7:
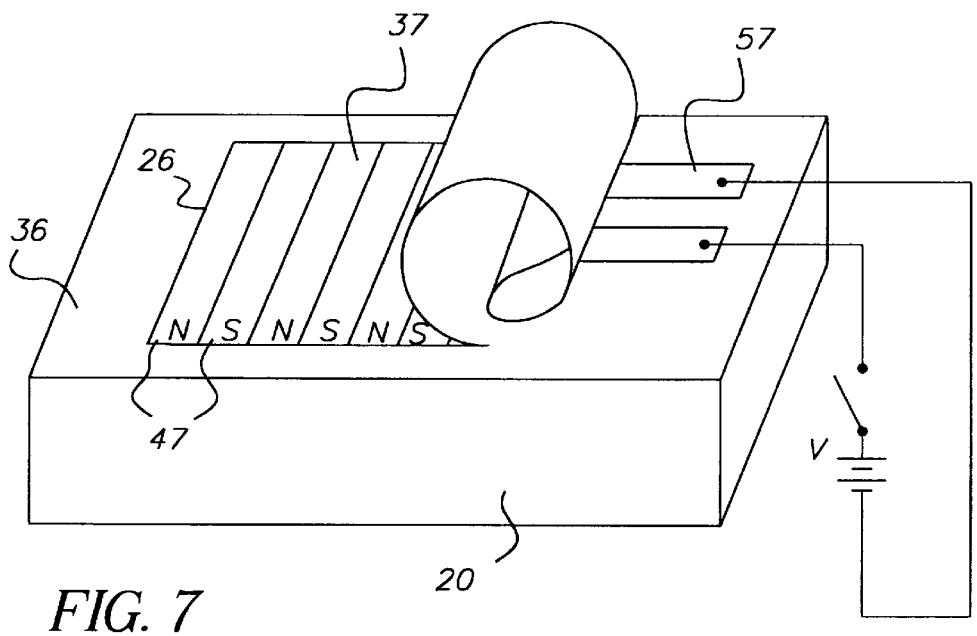
FIG. 7 is a diagram of a first preferred embodiment of the individual micro-shutter.

FIG. 7 is a diagram of a first preferred embodiment of the individual micro-shutter. The embodiment shown in FIG. 7 illustrates conductive paths 57 traversing the surface of substrate 20. These conductive paths 57 are electrically connected to a current source V which can supply of electrical current through conductive paths 57. The current source V illustrate in FIG. 7 is a voltage controlled source of current. However, current controlled sources are equally envisioned as part of the present invention.

The preferred embodiment of the present invention envisions that the micro-shutter application employ a nickel alloy, or permalloy, in constructing the micro-shutter segment 26. The preferred chemical composition of this nickel alloy, or permalloy, material is Ni approximately 79%, Mo approximately 4% and balance is Fe (approximately 17%). This preferred composition for nickel alloy, or permalloy, having this chemical composition results in magnetic properties for this material yielding a maximum permeability 100K (where the permeability is the ratio of the magnetic flux density B to the corresponding magnetic field strength H), saturation inductance of approximately 8,700 Gauss and very low coercivity (approximately 0.05 Oersteds). It is specifically envisioned that other magnetic materials with the same or close magnetic properties (for example Mu-metal) could be used in our application, however it is important that material used within the context of the present invention be sufficiently flexible such that it can easily unroll from rolled up position.

This process may differ depending on the material used to form substrate 20. The preferred embodiment employs glass as the substrate 20 material because it is inexpensive and commonly available with flat smooth surfaces. Other prospective materials can also serve as substrate 20. These materials, which are considered to be equivalent materials, comprise fused quartz, or in reflective mode operation, single crystal silicon, or the like. Photoresist layers are applied and patterned to define the pixel areas 36. Part of the pixel area 36 overlays the release area 37 and part does not. The patterned structure is then etched using a nickel etch (nitric acid) and then introduced into a freon (CF(4)) plasma which etches through the silicon dioxide layer. The plasma will also etch about 100 Å into the underlying photoresist layers or in the thicker silicon dioxide layer. The structure is then exposed to atomic oxygen at 300° C. in a down stream asher. In several minutes the oxygen removes the release layers and the movable electrode coils up. The structure after coiling is shown in rolled up states 27 in FIG. 6. Coiling occurs because the bottom silicon dioxide has low stress, the first nickel layer has compressive stress and the second nickel layer has tensile stress. The structure is now ready for packaging in a hermetic package.

In the preferred embodiment, corrugations as shown in FIG. 6, are provided to enhance the lateral stiffness to keep the film from curling perpendicular to the intended roll direction. The periodicity and depth of the corrugations are important parameters in the fabrication of the display structure. There may be advantages in making the corrugations very deep. Deeper corrugations make the film more flexible and this would allow the use of thicker stiffer materials to be used in the film. A thicker film may be stronger. Another advantage of deeper corrugations would be lower reflectivity of incident light. Light passing to the bottom of a corrugation has a low probability of being reflected back out, especially if the material in the film is somewhat light absorbing. Instead of using corrugations for anisotropic stiffening, a deposition process, such as evaporation or ion bombardment at an angle, may be used to induce anisotropic stress.

Note that in the process just described, the size of the coil, the magnetism required to roll it out, and the response time are important parameters in the design of particular devices. Assuming other parameters are held constant, some general rules can be given for these parameters. The larger the roll, the less magnetism required to unroll the coil. The thicker the release layer, the higher the magnetism required to roll out the film. The thicker the insulating layers, the higher the roll out magnetism. The higher the differential stress in the two layers, the smaller the coil. The smaller the coil, the faster the roll up response. The roll out response time decreases as the roll out magnetism increases.

Use of light weight or less dense moveable electrode material results in faster response. For example, use of graphite and diamond or diamond-like films instead of silicon dioxide would produce a much faster opening and closing of the valve.

It is also possible to build the shutter so that the insulation film over the release layer is compressive and the metal film over the insulation film is tensile. When released this double layer will function in a way similar to the structures mode using two oppositely stressed nickel films. An example would be compressive silicon dioxide and tensile nickel.

Note also that deposited films generally have internal stress which will vary in direction and magnitude depending on deposition conditions. Some films have uniform stress, some films have stress which varies through film. By choosing the materials and deposition processes, one can generate structures where the first part of the film down is compressive and as deposition continues the stress gradually becomes tensile so that upon release, the film rolls up. Or one can form a single film in which the stress in the lower part is compressive and in the top part is tensile.

Figure 8:
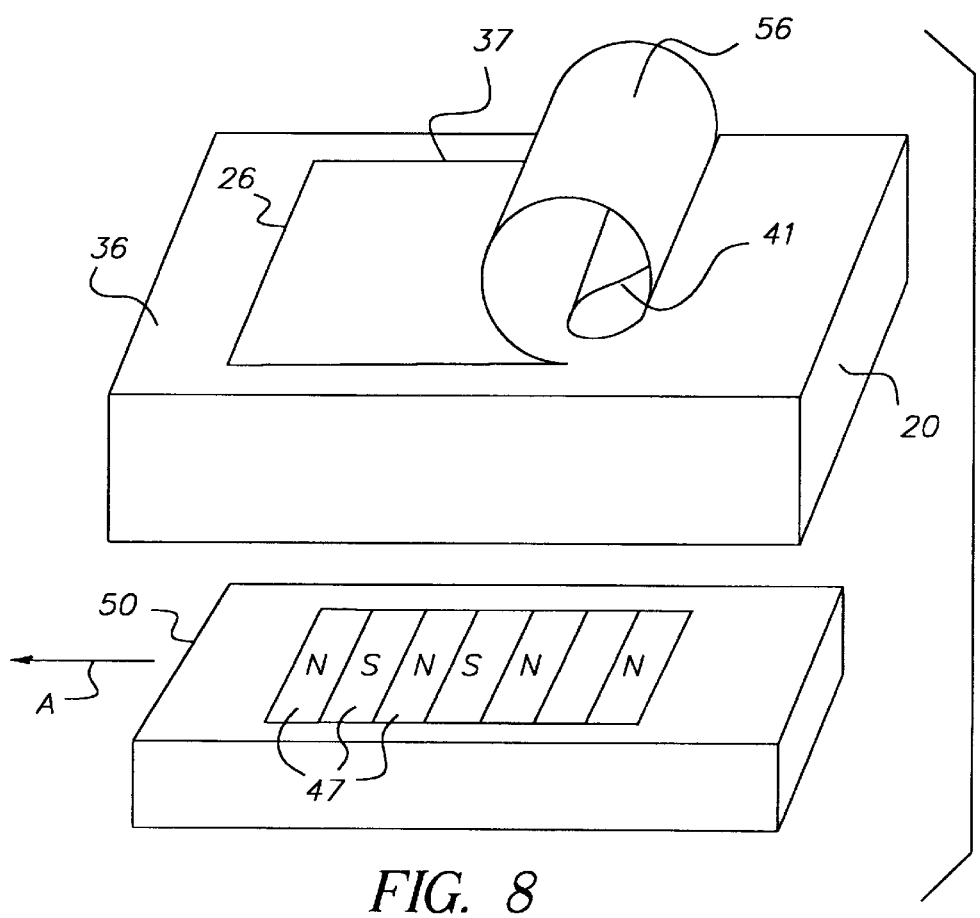
FIG. 8 is a diagram of a second preferred embodiment of the individual micro-shutter.

Referring now to FIG. 8, in conjunction with FIG. 6, the second preferred embodiment of the present invention is illustrated within the context of using the magnetic fields that draw the nickel layer 56 towards the opposite poles 47 on magnetic layer 50 below the substrate 20. The actuation, within the preferred embodiment, is caused by a magnetic field that is created by permanent magnets within magnetic layer 50. Preferably, these permanent magnets are arranged as a series of opposite poles 47 with an alternating north and south pole configuration, to force the nickel layer 56 to unroll towards the end 41 that is not fixedly attached to the substrate 20. However, a single magnetic pole will also function to unroll the nickel layer 56. Permanent magnets are made from flexible ferrite magnetic materials, or other magnetic material, depends on applications. We used magnetic material such as Strontium Ferrite: SrOx6(Fe2O3). Residual induction of this magnetic material is approximately 2450 Gauss, Intrinsic Coercive Force is approximately 3300 Oersteds, and energy product is 1.4 MGOe. The result of bring magnetic layer 50 into close correspondence with substrate 20 is that the release area 37 is forced to uncoil. The release area 37 within pixel area 36 is forced to uncoil using the magnetic fields within magnetic layer 50 to draw the nickel layer 56 towards the opposite poles 47 on magnetic layer 50 below the nickel layer 56. Multipole magnetization process of micro magnets is the basic theory used in creating a magnetic material (such as the nickel layer 56) that has the capability to roll and unroll. This process is described in prior art Patent Numbers: U.S. Pat. Nos. 5,659,280; 5,691,682; and 5,852,393.

For a unique display appearance, the bottom of the magnetic micro shutter display may be coated with a colored material, for instance blue. Then the individual segments will appear blue. Also the silver color of the non-segment areas may be coated and made a separate color, for example yellow. This would give the display an appearance of a yellow background with blue digits.

Parts List 10 magnetic disk
12 center pivot point
14 digits
16 exposure frame numbers
17 fixed point
18 reader
20 substrate
24 magnetic micro-shutter display
26 magnetic micro-shutter segments
27 magnetic micro-shutter segments in a rolled up state
28 magnetic micro-shutter segments in an unrolled state
32 a high permeable permanent magnet
36 pixel area
37 release area
40 indexing gear
50 magnetic layer
41 not fixedly attached end
42 magnetized areas
44 pivot point
46 gear teeth
56 nickel layer
51 rotating disk
52 rotating disk
57 conductive paths

What is claimed is:

1. An exposure frame counter for a camera comprising:
    a magnetic wheel having a first surface with a series of frame count areas that are formed on the wheel;
    an alterable indicia contained within each of the frame count areas;
    at least one display formed near the first surface such that the display mates with the alterable indicia contained within the frame count areas; and
    wherein the display further comprises:
        a plurality of micro-shutters having segments that curl and uncurl in response to the alterable indicia contained on the frame count areas.

2. The invention of claim 1 wherein the frame count areas further comprises each of the frame counts being formed essentially as a seven segment display.

3. The invention of claim 1 wherein the display is magnetic and the micro-shutter segments curl and uncurl in response to alterable indicia which is magnetic.

4. The invention of claim 3 wherein the alterable indicia comprises a series of conductive paths below the micro-shutter segments that cause the micro-shutter segments to curl and uncurl in response to current flowing through the conductive paths.

5. The invention of claim 1 wherein the display is a seven segment display and the frame count areas contain the alterable indicia in essentially a seven segment indicia whose segments mate with segments on the seven segment display.

6. The invention of claim 1 wherein frame count information is recorded onto the magnetic disk and the magnetic disk is connected to location means for altering by one frame count the location of the magnetic disc.

7. The invention of claim 1 further comprising means for erasing the alterable indicia.

8. The invention of claim 7 wherein the alterable indicia is magnetic and the means for erasing the alterable indicia is also magnetic.

9. The invention of claim 8 wherein the means for erasing further comprises a permanent magnet to erase exposure frame count information after it has been read and new exposure frame count information is being read by the magnetic micro shutters.

10. The invention of claim 8 wherein the alterable indicia resides on a movable magnetic layer that moves beneath the micro-shutter segments.

11. A method of making an exposure frame counter for a camera comprising the steps of:

providing a substrate having a series of micro-shutter segments on a first surface of the substrate segments that curl and uncurl in response to magnetic fields, and an alterable indicia that can create magnetic fields that correspond to the micro-shutter segments such that the micro-shutter segment create a discernable display; and altering the indicia to form at least one numeral on the discernable display.

12. The method of claim 11 wherein the providing step further comprises providing the display as a seven segment display.

13. The method of claim 11 wherein the providing step further comprises providing the alterable indicia which is electro-magnetic and the micro-shutter segments in the display curl and uncurl in response to an electro-magnetic field provided by the alterable indicia.

14. The method of claim 13 wherein the step of altering the indicia further comprises providing a series of conductive paths below each of the micro-shutter segments that cause the micro-shutter segments to curl and uncurl in response to current flowing through the conductive paths.

15. The method of claim 14 wherein the display is a seven segment display and the frame count areas contain the alterable indicia in essentially a seven segment indicia whose segments mate with segments on the seven segment display.

16. The method of claim 11 wherein the providing step further comprises providing frame count information recorded onto the indicia, and further providing means for the altering the frame count information on the indicia.

17. The method of claim 16 further comprising the step of erasing the alterable indicia.

18. The method of claim 17 wherein the step of erasing the alterable indicia erases using a magnetic.

19. The method of claim 18 wherein the step of erasing further comprises erasing frame count information after it has been read and new exposure frame count information is currently being read by the magnetic micro shutters.

20. The method of claim 18 wherein the alterable indicia resides on a movable magnetic layer that moves beneath the micro-shutter segments.

* * * * *